Figure 1:
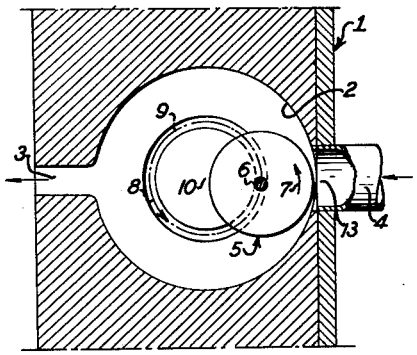

March 10, 1964     R. BARAINSKY     3,123,859
SLOT NOZZLE APPARATUS FOR PRODUCING THERMOPLASTIC
FOILS, SHEETS AND THE LIKE
Filed March 29, 1961

INVENTOR
RUDOLF BARAINSKY

BY
ATTORNEYS

United States Patent Office 3,123,859
Patented Mar. 10, 1964

3,123,859
SLOT NOZZLE APPARATUS FOR PRODUCING THERMOPLASTIC FOILS, SHEETS AND THE LIKE
Rudolf Barainsky, Bergisch-Gladbach, Germany, assignor to Dyna-Plastik-Werk G.m.b.H., Bergisch-Gladbach, Germany, a German corporation
Filed Mar. 29, 1961, Ser. No. 99,318
Claims priority, application Germany Mar. 30, 1960
6 Claims. (Cl. 18—12)

The present invention relates to a slot nozzle apparatus for producing thermoplastic foils, sheets, and the like in continuous and contiguous film form.

While wide slot nozzles are known for use in producing foils, sheets, and the like from thermoplastic materials, such as the T-shaped and/or L-shaped wide slot nozzles, the performance of such nozzles depends upon the uniformity of flow of the thermoplastic mass at all points within the nozzle channel. It will be appreciated that dead zones in the nozzle channel must be avoided or else the heat sensitive thermoplastic material will readily decompose or will lose its desired characteristics. Various attempts have been made to avoid the presence of dead zones within the nozzle channel, as for example, by providing baffles, guiding strips, and curved shaped elements.

Where a wide-slot nozzle, having fixed elements is concerned, i.e. where there are no moving parts in the nozzle assembly, the particular construction of the slot nozzle must be chosen in specific relation to the thermoplastic material to be treated, the specific flow characteristics of such material in dependence upon temperature, etc., and the adjustment of the specific flow capacity of the nozzle chamber as a function of the thermoplastic material employed. If the foregoing factors are not taken into consideration in constructing the wide slot nozzle, the temperature of the nozzle and of the thermoplastic material will have to be maintained comparatively low in order to avoid and forestall any decomposition of the heat-sensitive thermoplastic material. At such comparatively low temperatures, however, the quality of the shaped or extruded foil or sheet produced would be poor and extremely high pressures would have to be maintained in the nozzle in order to convey the plastic mass through the wide slot nozzle opening. This is true since the viscosity characteristics of thermoplastic materials at comparatively low temperatures are not conducive to easy formation of continuous and contiguous foils or sheets. Accordingly, the production of thin foils, using wide slot nozzles containing fixed elements is not conveniently obtainable in commercial practice.

Where wide slot nozzles containing movable elements are concerned, some of the foregoing drawbacks may be overcome. In this connection a conveyor worm is often employed in the nozzle channel for the purpose of conveying the thermoplastic material through the nozzle slot. A conveyor worm is often employed which has a constant cross section and/or is provided with a specific decrease in cross section for urging the thermoplastic material in the desired manner. The use of rotatable conveyor worms in slot nozzle assemblies permits the quantity of plastic material emerging from the nozzle slot to be adjusted so as to obtain a uniform flow of material in foil or sheet form.

Advantageously, where movable elements are employed in a wide slot nozzle assembly, i.e. a conveyor worm, the flow of plastic material along the nozzle channel is forcibly carried out by the conveyor action of the worm.

In this manner, it is not necessary to regulate the quantity of plastic material being fed to the nozzle from the extruder apparatus in dependence upon the number of revolutions and the volume capacity of the worm, or vice versa. Where two or more conveyor worms are arranged for coaction together, in addition to a combined conveying effect, the coacting worms serve to clean one another along their mutually adjacent worm path portions. Among the disadvantages which have heretofore prevented the general commercial application of conveyor worm devices for producing films, sheets, and the like from heat-sensitive thermoplastic materials in wide slot nozzle arrangements is the fact that the extruder output or feed to the nozzle channel of the wide slot nozzle device must be regulated in dependence upon the number of revolutions of the conveyor worm, as well as the fact that considerable friction heat is generated during worm operation, especially at the outer edges of the worm. Such friction heat, of course, leads to decomposition of the heat-sensitive plastic material. Notably, however, a major disadvantage of the use of conveyor worms of conventional construction is the fact that the material which emerges from the wide slot nozzle is not uniform due to the form of the plastic mass resulting from the particular shape of the conveyor worm. Thus, at the portions of the nozzle assembly where the spiral path of the worm is situated adjacent the nozzle opening, the material will emerge readily, although a certain backflow and blockage will occur where the slot nozzle is covered over, as for example, at the edges of the slot. The strip form of the material emerging from the slot may be adjusted to a certain extent, although such adjustment is effected in a cumbersome manner. However, the physical properties and the appearance of the foil produced, as a consequence thereof, are detrimentally affected. It has also been proposed to equip the interior of the nozzle with a stirrer device. With the aid of such a stirrer device, the particular disadvantages of the conveyor worm may be substantially overcome. Nevertheless, such stirrer devices are unable to favorably influence the free flowing of the thermoplastic material or conveying of the same in longitudinal direction. Where relatively short nozzles are employed, such disadvantage may be overlooked. However, where longer nozzle channels are employed, the free flow of the plastic material is not only desirable but also necessary to some extent. Understandably, with stirring devices, it is difficult to obtain a self-cleaning of the stirring elements with respect to any adhering plastic material.

It is an object of the present invention to overcome the foregoing drawbacks and to provide a wide slot nozzle apparatus and process for producing foils, sheets, and the like in continuous and contiguous form from heat-sensitive thermoplastic materials.

Figure 3:
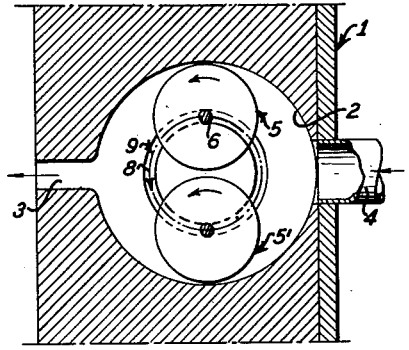
Figure 2:
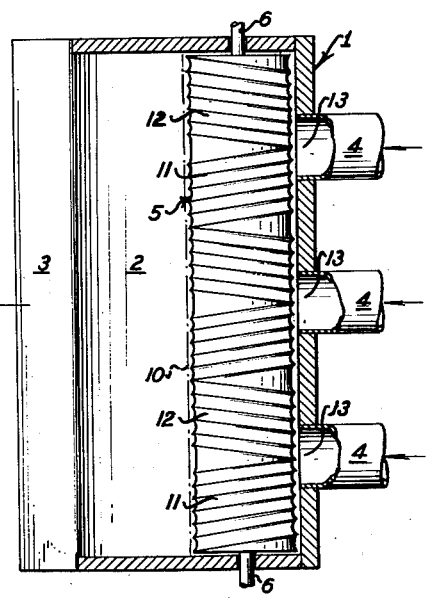

Other and further objects of the invention will become apparent from a study of the within specification and accompanying drawing in which:

FIG. 1 is a schematic sectional view of a wide slot nozzle arrangement in accordance with one embodiment of the invention, FIG. 2 is a schematic top sectional view of the embodiment shown in FIGURE 1, wherein the conveyor worm is shown with sets of worm paths of different pitches, and FIG. 3 is a schematic sectional view of a further embodiment of the invention, wherein two coacting conveyor worms are provided.

It has been found, in accordance with the present invention, that an effective slot nozzle may be provided for producing foils, sheets, and the like from flowable thermoplastic material in continuous and contiguous film form without undesired decomposition of the thermoplastic material due to accumulations thereof in dead zones along the path through which the plastic material is conveyed. The slot nozzle comprises means defining an elongated nozzle chamber having an inlet for thermoplastic material and an outlet for said material. Specifically, the outlet is defined by an axially extending slot means for passage of the thermoplastic material therethrough to impart to said material an elongated strip form in a continuous and contiguous manner. The conveying means for the nozzle chamber define an axially oscillatable eccentric spiral path for conveying the thermoplastic material from the inlet to and through the outlet while distributing the material axially within the chamber along the extent of the slot means.

The nozzle chamber is suitably provided with an interior wall of round cross section, and the conveying means may take the form of at least one conveyor worm having a smaller periphery than that of the interior wall of the chamber. Thus, the worm may be disposed within the chamber and mounted for rotation simultaneously about the worm axis as well as the axis of the chamber, such that the periphery of the worm will be adjacent the inner wall of the chamber during the rotation. Conveniently, planetary-gear arrangements of known construction may be provided so as to effect the desired rotation of the worm about its own axis as well as about the axis of the confining nozzle chamber.

Advantageously, the inlet may include at least two separate axially adjacent, spaced apart openings on one longitudinal side of the chamber while the outlet slot means may be defined on the opposite longitudinal side of the chamber. For each separate inlet opening, there may be provided on the rotating worm a set of axially divergent worm paths. Such worm paths may be located on the worm axially adjacent each corresponding opening so as to effect the axial distribution of the thermoplastic material entering the nozzle chamber at the inlet, and further combine such material entering the nozzle chamber from adjacent inlet openings. The material, separately entering from the inlet openings, will merge together along the longitudinal extent of the nozzle chamber due to the axially divergent worm paths which effectively oscillate during rotation of the worm. The material will be easily conveyed to the slot means on the remote side of the nozzle chamber and accordingly will be conveyed transversely through the slot means in the form of an axially continuous strip.

In the preferred embodiment of the invention, a chamber is provided with an interior wall of cylindrical shape having a forward axially elongated outlet slot means at one circumferential point and at least two separate axially adjacent, spaced apart rearward inlet openings at another circumferential point remote from said one point. A circular worm may be provided for rotation within such chamber having a worm periphery with a portion thereof in substantially continuous axial abutment with the chamber inner wall along the longitudinal extent of the chamber during each cycle of rotation of the worm about the axis of the chamber.

The diameter of the chamber may be effectively provided at about 2 times the diameter of the worm although other dimensional relationships of diameter may be chosen as desired. In the same manner, the worm may be provided in conical form rather than in cylindrical form, depending upon the required operation.

The ratio of the number of revolutions of the worm about the worm axis to the number of revolutions of the worm about the chamber axis may be constant, i.e. in a specific ratio, or else in an adjustable ratio. The same applies where two or more coacting conveyor worms are provided within the chamber for planetary rotational movement not only about their respective axes but also about the longitudinal axis of the chamber.

Thus, in accordance with the invention, the free flow of thermoplastic material entering the nozzle channel from the extruder or other feeding device may be maintained within the nozzle channel of the wide slot nozzle arrangement of the invention while a lateral distributing movement along the longitudinal extent of the chamber is imparted to the material. Accordingly, the free flowing transverse stream of material from the inlet to the outlet of the nozzle chamber is partially overlaid with an axially diverging movement of the material so as to merge the material into a contiguous mass for desired discharge through the wide slot nozzle opening. The axial distribution of the material is effectively carried out by the conveyor worm or worms in consequence of the presence thereon of axially diverging worm paths.

Advantageously, in accordance with the invention, an automatic thorough cleaning of the nozzle chamber is carried out during the constant rotation of the worm or worms in addition to the simultaneous conveying of the free-flowing material not only in transverse direction to the outlet slot but also in axial or longitudinal direction along the extent of the chamber. This feature permits the employment of extremely long nozzle arrangements having extremely wide outlet slots, without the disadvantages normally occurring in conventional equipment taking place.

It will be appreciated that, in accordance with the invention, the thermoplastic material may be fed to the nozzle chamber at more than one inlet opening without disturbance of the flow of material through the nozzle chamber and out of the outlet slot. Within the confining zone defined by the nozzle chamber interior wall, a longitudinal movement is superimposed upon the transverse free flow of material from the inlet openings to the outlet slot, so that in every case within the nozzle chamber zone, a compulsory movement of the material will occur both in transverse and longitudinal direction. Additionally, since the worm and interior wall of the chamber are always in substantial contact with one another along one peripheral portion, no dead spaces will occur which would otherwise permit the accumulation of thermoplastic material and the possible decomposition of such material. Since the shearing of the synthetic plastic material between the conveyor worm and the nozzle channel interior wall only occurs along one peripheral point during rotation, any friction heat formed is so slight that it does not detrimentally influence the nature and characteristics of the thermoplastic material, and therefore objecions from this source may be disregarded.

It will be appreciated that, in accordance with an alternate embodiment of the invention, not only one or two worms may coact together, but also three or more worms may be arranged for rotation about their respective axes as well as about the axis of the nozzle chamber. Of course, the number of such worms will depend upon the diameter of the nozzle chamber and the diameters of the particular worms. While the ratio of number of revolutions of each worm about the corresponding axis thereof to the number of revolutions about the chamber axis may be specific and constant, by employing appropriate gear arrangements, such ratio may be adjusted as desired. In the same way, where a plurality of conveyor worms are provided, the number of revolutions of the particular worms may be equal or may vary with respect to one another during each rotation about the chamber axis.

By providing divergent pitches on the conveyor worm or worms, so that the worm paths will diverge laterally outwardly along the longitudinal extent of the chamber, the thermoplastic material will merge and combine along the axial extent of the chamber. In turn, such material will readily pass out through the nozzle slot in continuous and contiguous form. However, the pitch direction of the conveyor worms may also be adjusted such that the material passes centrally so as to converge rather than diverge the flow of such material. In essence, the pitch of the conveyor worm will determine the guiding path of distribution of the thermoplastic material from the inlet to the outlet slot. The worm paths are suitably shallow in path depth, since such construction will avoid the presence of dead zones and permit the more efficient cleansing of the worm as it passes into contact along the chamber interior wall.

Referring to the drawing, in FIGURES 1 and 2, a nozzle member 1 is shown having a cylindrical chamber 2 longitudinally disposed within nozzle member 1, said chamber being in communication with an inlet source through a plurality of axially spaced apart inlet feeds 4 on one longitudinal side of chamber 2. On the forward side of chamber 2, remote from the inlet feeds 4, a wide slot 3 is defined longitudinally along nozzle member 1 communicating chamber 2 with the exterior. Rotatably positioned within chamber 2 is a conveyor worm 5. Conveyor worm 5 is arranged for rotation in the direction of the arrow 7 about the worm axis 6 and simultaneously in the direction of the arrow 8 about the axis 10 of the chamber 2. Thus, the axis 6 of the worm 5 will describe a circle 9 in the direction 8 about the cylinder 2, the center of such circle coinciding with the axis 10 of chamber 2. The worm 5 is provided with three separate sets of diverging worm paths 11 and 12 respectively. Each set of paths 11 and 12 are located axially adjacent the correspondingly situated inlet openings 13. All in all, three separate inlet feeds 4 are provided, each being connected for conveying thermoplastic material into chamber 2 through a corresponding inlet opening 13. As the thermoplastic material enters the inlet openings 13, the same will be guided by means of worm 5 and paths 11 and 12 in divergent directions laterally outwardly along the longitudinal extent of chamber 2. In this manner, the thermoplastic material entering adjacent openings 13 will be combined so that a continuous mass of thermoplastic material will be conveyed transversely from inlet opening 13 to wide slot 3 at the opposite longitudinal side of chamber 2. Thus, the free flowing thermoplastic material entering chamber 2 through openings 13 will be conveyed by worm 5 not only transversally to wide slots 3 but also longitudinally along chamber 2 in axial direction whereby efficient distribution of the inflowing material will take place and the emergence of the desired film in continuous and contiguous form. The feeding of the thermoplastic material through the inlet feeds 4 may take place in the customary manner by means of extruder devices or the like.

In FIGURES 1 and 2, the diameter of the worm 5 corresponds to ½ of the diameter of the cylindrical nozzle chamber 2, whereby worm 5 will execute two revolutions about its own axis 6 for each revolution of worm 5 about the axis 10 of chamber 2, along the circle 9. Nevertheless, the diameter of the worm may be maintained smaller or larger than in a ratio of ½ the diameter of the nozzle chamber 2, so long as the diameter of the worm is less than the diameter of the nozzle chamber. While the pitch direction of the worm paths 11 and 12 is indicated as passing laterally outwardly from the center of the inlet openings 13, toward the continuous wide slot 3, such worm paths may be provided in converging direction if desired. Alternatively, a common inlet feed 4 may be provided in communication with chamber 2 by means of an axially elongated common inlet opening 13. In any case, the worm 5 serves to efficiently convey the free flowing material entering the inlet opening or openings transversely through chamber 2 to the wide slot 3 while also distributing such material in axial direction to ensure that the material leaving wide slot 3 will be in continuous and contiguous film form.

With respect to FIGURE 3, an alternate embodiment is shown in which an additional worm 5' is provided, such that worms 5 and 5' will rotate about their own axes as well as about the axis of chamber 2 in the direction of arrow 8, the worm axes describing a circle 9 having a center coinciding with the axis of chamber 2. In this embodiment, both worm 5 and worm 5' are maintained in abutting relationship with the confining wall of chamber 2 within nozzle member 1 along a common peripheral portion, worms 5 and 5' also being disposed in sufficient juxta position to ensure cleansing of the worm paths of both coacting worms as well as the interior wall surface of chamber 2 with respect to the thermoplastic material present in chamber 2. Advantageously, worms 5 and 5' are positioned diametrically opposed with respect to one another and are arranged for movement at equal velocities about the circle 9.

It will be appreciated that while wide slot 3 has been shown in thin lip form of constant dimensions, slot 3 may be provided as a V-shaped slot or any other suitable slot as desired.

What is claimed is:
1. Slot nozzle for production of foils, sheets, and the like from flowable thermoplastic material which comprises means defining an elongated nozzle chamber provided with an interior wall of round cross-section and having an inlet for thermoplastic material and an outlet for said material, said outlet being defined by an axially extending slot means for passage of thermoplastic material therethrough to impart to said material an elongated strip form, and conveying means defining an axially oscillatable eccentric spiral path including at least one conveyor worm of constant diameter having a smaller periphery than that of said interior wall disposed within said chamber and mounted for rotation simultaneously about the axis of the worm and the axis of the chamber peripherally adjacent the interior wall of said chamber, for conveying thermoplastic material from said inlet to and through said outlet while distributing said material axially within said chamber along the extent of said slot means.

2. Slot nozzle according to claim 1 wherein the inlet includes at least two separate axially adjacent spaced apart openings and said worm includes a set of axially divergent worm paths axially adjacent each of said openings for axially distributing the thermoplastic material and combining the material from adjacent openings and conveying said material to said slot means and transversely through said slot means in the form of an axially continuous strip.

3. Slot nozzle according to claim 2 wherein said chamber is provided with an interior wall of cylindrical shape said wall is provided with a forward axially elongated outlet slot means at one circumferential point and at least two separate axially adjacent spaced apart rearward inlet openings at another circumferential point remote from said one point, said worm being positioned for rotation within said chamber and having a worm periphery with a portion thereof substantially in continuous axial abutment with the chamber interior wall during each cycle of rotation about the axis of said chamber.

4. Slot nozzle according to claim 3 wherein a pair of conveyor worms is provided in planetary rotational relation, said worms being mounted for joint rotation about their respective axes and about the axis of said chamber.

5. Slot nozzle according to claim 4 wherein the ratio of the number of revolutions of said worms about their respective axes with respect to one another and with respect to the number of revolutions of said worms about the chamber axis is provided adjustable.

6. Slot nozzle for production of continuous foils, sheets, and the like from flowable thermoplastic material which comprises wall means defining an elongated enclosed nozzle chamber of circular cross-section and having a constant diameter, said chamber having an axially extending continuous outlet slot defined through the wall means thereof, said chamber further having an axially extending discontinuous inlet slot defined through said wall means remote from said outlet slot, said discontinuous inlet slot including at least two distinct axially adjacent inlet openings, and at least one conveyor worm of smaller periphery than that of said chamber, said worm having a constant diameter and being mounted for simultaneous rotation about the axis of the worm and about the axis of said chamber with the periphery of said worm in contact with the wall means of said chamber, said worm having a set of dual worm paths axially adjacent each of said inlet openings, the dual worm paths of each set axially diverging in pitch from one point on the worm periphery to a point on said worm periphery remote from said one point, whereby thermoplastic material taken into said chamber through each inlet opening may be axially distributed within said chamber by said diverging dual paths of the worm, combined with thermoplastic material taken into said chamber at an adjacent inlet opening and conveyed through the outlet slot in continuous film form along the axial extent of said outlet slot.

References Cited in the file of this patent

UNITED STATES PATENTS

| | | |
|---|---|---|
| 2,229,422 | Schade et al. | Jan. 21, 1941 |
| 2,520,337 | Roberts | Aug. 29, 1950 |
| 2,648,296 | Oliver | Aug. 11, 1953 |

FOREIGN PATENTS

| | | |
|---|---|---|
| 587,882 | Belgium | Feb. 22, 1960 |
| 65,465 | Denmark | Mar. 3, 1947 |
| 1,052,673 | Germany | Mar. 12, 1959 |
| 1,248,798 | France | Nov. 14, 1960 |